Patented Aug. 28, 1928.

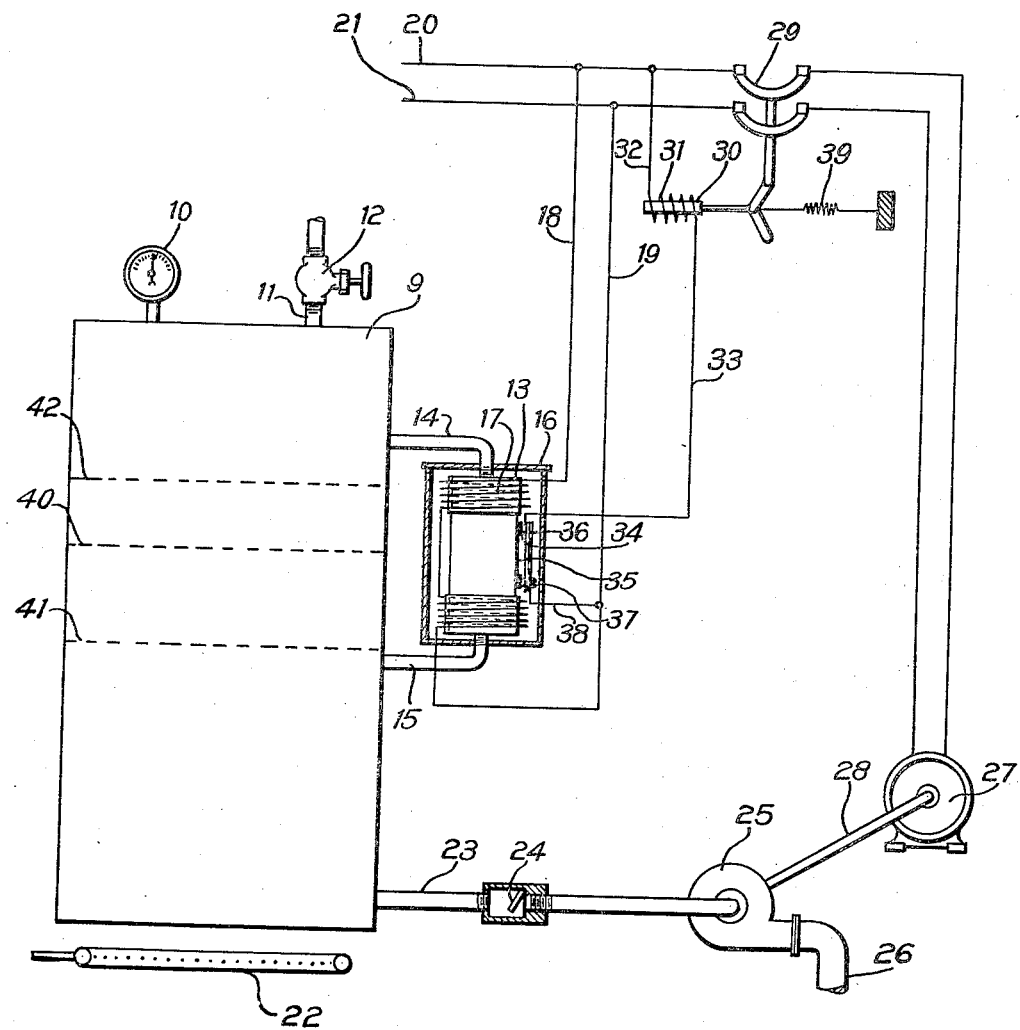

1,682,448

UNITED STATES PATENT OFFICE.

VICTOR G. VAUGHAN, OF MANSFIELD, OHIO, ASSIGNOR TO WESTINGHOUSE ELECTRIC & MANUFACTURING COMPANY, A CORPORATION OF PENNSYLVANIA.

CONTROL SYSTEM.

Application filed June 16, 1926. Serial No. 116,499.

My invention relates to control systems and more particularly to electric control systems for boilers.

An object of my invention is to provide a simple control system that shall be efficient in operation.

Another object of my invention is to provide automatic means for supplying material to be heated to a heating plant.

Another object of my invention is to provide electrically operated liquid-supply means for automatically maintaining a sufficient amount of liquid in a boiler.

Another object of my invention is to provide means responsive to the temperature of a heating plant to regulate the supply of material to be heated, to said heating plant.

Other objects of my invention will be apparent from the disclosure.

In the present embodiment of my invention, a by-pass or container is mounted on a boiler with which it has such communication through a conduit at its top, at a point above the desired liquid level in the boiler, and at its bottom, at a point below said level, that the liquid level in the boiler and container will be the same. Electrical heating means is provided for the container. A pump, driven by an electric motor, is provided to maintain the liquid in the boiler at the desired level.

A circuit breaker or other circuit interrupting means, which is operated by an electromagnet against the action of a spring normally holding the circuit breaker open, is provided in the motor circuit. A thermostatic switch mounted on the container and thermally responsive thereto, constitutes a part of the electromagnetic circuit.

In the drawing, the sole figure is a diagrammatic view of the control system connected with an electrically heated boiler, the system being shown in operation.

Referring to the drawing, a boiler 9 is provided with a gauge 10 and a steam outlet pipe 11 which has a control valve 12. Adjacent to the boiler is a by-pass or auxiliary container 13 which is provided, at its top, with a conduit 14 and, at its bottom, with a conduit 15, said conduits affording communication with the boiler.

A suitable casing 16 may be provided for the container.

An electric heating coil 17 is provided for heating the container. This heating coil is electrically connected, by conductors 18 and 19, to electric mains 20 and 21, respectively. An additional means for heating the water in the boiler is preferably provided. A gas burner 22, connected to a gas supply source (not shown), may be utilized for this purpose.

Suitable liquid-supply means is provided to maintain the proper liquid level in the boiler. Such supply means may conveniently consist of a feed conduit or pipe 23 having a check valve 24 therein and connected to a pump 25 which receives liquid from a supply source 26. The pump is preferably driven by an electric motor 27 which is operatively connected to said pump by means of a shaft 28.

The motor is driven by power received through mains 20 and 21 from a source of power (not shown). In the motor circuit, a circuit-interrupting means 29 is provided to control the operation of the motor.

This circuit interrupter is shown in its closed position and is held in such position by means of an electromagnet 30 which is energized by the current flowing through the coil 31. One end of the coil 31 is connected to the conductor 32 which is connected to the main 20. The other end of the coil is connected, by means of a conductor 33, to the contact member 34 of the thermostatic switch 35 which is mounted on the container 14.

In the form of thermostatic switch shown, a bimetallic thermostatic strip 36 is mounted on a terminal post 37, which is connected, by a conductor 38 to the conductor 19. The free end of the thermostatic strip 36 is shown in electrical engagement with the contact member 34. A spring 39 is provided to open the circuit interrupter 29 upon deenergization of the electromagnet 30 but this spring is not strong enough to open the circuit interrupter when the electromagnet is energized.

The average liquid level in the boiler is represented by the broken line 40 and, since the container 14 has communication at its top and bottom with the boiler, the liquid level in the container will be the same as in the boiler.

At the average liquid level, if the liquid be water, the temperature of the container will be 212° F. or slightly above, depending upon pressure conditions, since, as long as there is a substantial amount of water in the container, the temperature cannot rise far above the boiling point of water. The thermostatic strip 36 herein shown, is so designed that at a temperature of 212° F., or slightly above, it will be in a deflected position, out of engagement with the contact member 34. In this position, as will be evident by referring to the drawings, no current will flow through the coil 31 and the spring 39 will therefore hold the circuit breaker 29 in its open position, thus disconnecting the motor 27 from the power source. Of course, a thermostatic switch which breaks the circuit at high temperatures and closes it at low temperatures may be used by interchanging the spring and the electromagnet.

When the liquid level in the boiler falls to a point below the level 40, as, for instance, to the level indicated by the broken line 41, the container 14 will be filled with steam and since there is no water in the container, the temperature in the container will rise considerably above boiling point, upon continued heating by the heating coil 18.

This increase of temperature will cause the thermostatic strip 36 to bend towards the container until it comes into contact with the contact member 34. This closes the circuit through the coil 31, and energizes the electromagnet 30 which will be moved against the action of the spring 39 to close the circuit interrupter 29, thus electrically connecting the motor 27 to a power source and starting the pump 25.

The pump 25 will operate until sufficient liquid has been pumped into the boiler to raise the liquid therein to a higher level, indicated by the line 42 and this increase in liquid level will, of course, act to cool the container 14. Such cooling will cause the thermostatic strip 36 to be deflected away from the container, thus opening the circuit through the coil 31 and permitting the spring 39 to open the circuit breaker 29, thus stopping the motor 27 and the pump 25.

While I have shown and described one embodiment of my invention, it is obvious that the invention may be practiced in other ways and I do not desire to limit myself to the present disclosure, except as limitations may be imposed by the prior art and the appended claims.

I claim as my invention:

1. In a heating plant, a boiler, a container having communication at its top and bottom with said boiler, means for electrically heating said container, fluid supply means for said boiler, electrical control means for governing the operation of said fluid supply means, a thermostatic switch mounted on, and responsive to the temperature of, said container for governing the operation of said control means, whereby a substantially constant fluid level is maintained in said boiler.

2. In a control system, a boiler, an auxiliary container communicating therewith, means for supplying fluid to the boiler and thermally actuated means located on the auxiliary container in thermal communication therewith for controlling the water supplying means in accordance with the height of water in the boiler.

3. In a control system, a boiler, means for supplying water to the boiler, electrically operable means for controlling said water supplying means, and thermally actuable means thermally associated with the boiler and energized in accordance with the height of water in the boiler for controlling said electrically operable means.

4. In a control system for a container provided with a fluid supply means and a heater, in combination an auxiliary container having communication at its top and bottom with the container, means for heating the auxiliary container, and means responsive to the temperature of said auxiliary container for controlling the fluid supply means in accordance with the quantity of fluid in the auxiliary container, whereby the fluid level obtaining within the container may be maintained at a substantially constant value.

In testimony whereof, I have hereunto subscribed my name this 28th day of May 1926.

VICTOR G. VAUGHAN.